(12) United States Patent
Klinedinst

(10) Patent No.: US 7,001,665 B2
(45) Date of Patent: Feb. 21, 2006

(54) ELECTROLUMINESCENT PHOSPHOR WITH PLURAL MOISTURE RESISTANT COATINGS THEREON

(75) Inventor: Keith A. Klinedinst, Hudson, MA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 10/115,645

(22) Filed: Apr. 3, 2002

(65) Prior Publication Data

US 2002/0150760 A1   Oct. 17, 2002

Related U.S. Application Data

(60) Provisional application No. 60/282,391, filed on Apr. 6, 2001.

(51) Int. Cl.
*B32B 5/16* (2006.01)
*C08K 11/08* (2006.01)

(52) U.S. Cl. .............................. 428/403; 252/301.4 R; 252/301.36; 428/407

(58) Field of Classification Search ................ 428/403, 428/407; 252/301.16, 301.33, 301.35, 301.36, 252/301.4 R
See application file for complete search history.

(56) References Cited

U.S. PATENT DOCUMENTS

| | | | |
|---|---|---|---|
| 4,097,776 A * | 6/1978 | Allinikov ..................... 313/502 |
| 4,508,760 A | 4/1985 | Olson et al. ........... 427/213.34 |
| 4,863,826 A | 9/1989 | Arakawa et al. ............. 430/138 |
| 5,049,408 A * | 9/1991 | Klinedinst et al. ............. 427/69 |
| 5,051,277 A * | 9/1991 | Sigai et al. ..................... 427/69 |
| 5,220,243 A * | 6/1993 | Klinedinst et al. ........... 313/502 |
| 5,454,892 A * | 10/1995 | Kardon et al. ................. 156/67 |
| 5,646,412 A | 7/1997 | Bryan et al. .............. 250/483.1 |
| 5,856,009 A | 1/1999 | Nishio et al. ................ 428/404 |
| 5,958,591 A * | 9/1999 | Budd .......................... 428/403 |
| 6,020,067 A * | 2/2000 | Iwama et al. ................ 428/403 |
| 6,064,150 A * | 5/2000 | Klinedinst et al. ........... 313/503 |
| 6,093,492 A * | 7/2000 | Bredol et al. ................ 428/403 |
| 6,248,261 B1 * | 6/2001 | Takemura et al. .... 252/301.6 S |
| 6,456,002 B1 * | 9/2002 | Klinedinst et al. ........... 313/503 |
| 6,562,460 B1 * | 5/2003 | Bayless ................. 428/402.24 |
| 6,855,271 B1 * | 2/2005 | Chua .................... 252/301.4 R |

OTHER PUBLICATIONS

Gordon et al., *Chemical Vapor Deposition of Aluminum Nitride Thin Films*, J. Mater. Res., vol. 7, No. 7 (1992).
Gordon et al., *Atmospheric Pressure Chemical Vapor Deposition of Aluminum Nitride Thin Films at 200-250° C.*, J. Mater. Res. vol. 6, No. 1 (1991).

* cited by examiner

*Primary Examiner*—H. Thi Le
(74) *Attorney, Agent, or Firm*—Robert F. Clark

(57) ABSTRACT

A moisture-resistant electroluminescent phosphor is provided wherein the individual phosphor particles have a first coating of an inorganic moisture-resistant coating and a second coating of an organic moisture-resistant coating. The process for making the moisture-resistant phosphor comprises applying a first layer of an inorganic moisture-resistant coating to individual particles of an electroluminescent phosphor to form a first-coated phosphor, substantially isolating said first-coated phosphor from contact with atmospheric oxygen and moisture, and applying a second layer of an organic moisture-resistant coating to the first-coated phosphor to form a second-coated phosphor.

6 Claims, No Drawings

ELECTROLUMINESCENT PHOSPHOR WITH PLURAL MOISTURE RESISTANT COATINGS THEREON

This application claims priority from Provisional Application No. 60/282,391, filed Apr. 6, 2001.

TECHNICAL FIELD

This invention relates to electroluminescent phosphors and more particularly to electroluminescent phosphors that have been treated to be moisture resistant. More particularly, this invention relates to electroluminescent phosphors having greatly reduced moisture absorption, greatly increased life and efficacy, and an economical manufacturing cost.

BACKGROUND ART

Treated phosphors are known from U.S. Pat. Nos. 4,585,673; 4,825,124; 5,080,928; 5,118,529; 5,156,885; 5,220,243; 5,244,750; and 5,418,062. It is known from some of the just-mentioned patents that a coating precursor and oxygen can be used to apply a protective coating. See, for example, U.S. Pat. Nos. 5,244,750 and 4,585,673. The treatment processes in several of the others of these patents employ chemical vapor deposition to apply a protective coating by hydrolysis. It also has been reported that chemical vapor deposition, at atmospheric pressure, can be used to deposit thin films of aluminum nitride coatings from hexakis(dimethylamido)dialuminum and anhydrous ammonia precursors upon silicon, vitreous carbon and glass substrates. See, for example, "Atmospheric pressure chemical vapor deposition of aluminum nitride films at 200–250° C.", Gordon, et al., Journal Material Resources, Vol. 6, No. 1, January 1991; and "Chemical vapor deposition of aluminum nitride thin films", Gordon, et al., Journal Material Resources, Vol. 7, No. 7, July 1992. See, also, U.S. Pat. Nos. 5,139,825 and 5,178,911, Gordon, which also disclose transition metal nitrides and other metallic nitrides such as gallium and tin, respectively. U.S. Pat. No. 5,856,009 discloses a high temperature process (i.e., 300 to 700° C.) for applying a silicon nitride coating over a previously applied heat resistant coating on phosphor particles. U.S. Pat. No. 6,064,150 (incorporated herein by reference) discloses an aluminum nitride coating process using a highly reactive hexakis(dimethylamido) dialuminum. The freshly applied nitride coating is susceptible to absorbing, or reacting with, atmospheric oxygen and moisture upon removal from the coating reactor.

SUMMARY OF THE INVENTION

It is, therefore, an object of the present invention to obviate the disadvantages of the prior art.

It is another object of the invention to enhance electroluminescent phosphors.

These objects are accomplished, in one aspect of the invention, by a process for providing a moisture-resistant electroluminescent phosphor that comprises the steps of providing individual particles of the phosphor with a first layer of an inorganic moisture-resistant coating to form a first-coated phosphor, substantially isolating the first-coated phosphor from contact with atmospheric oxygen and moisture, and providing the first-coated phosphor with a second layer of an organic moisture-resistant coating to form a second-coated phosphor. The second layer inhibiting the first layer from absorbing, or reacting with, atmospheric oxygen or moisture.

DETAILED DESCRIPTION OF THE INVENTION

For a better understanding of the present invention, together with other and further objects, advantages and capabilities thereof, reference is made to the following disclosure and appended claims.

Referring now to the invention with greater particularity, a process for providing a moisture-resistant electroluminescent phosphor comprises the steps of providing individual particles of the phosphor with a first layer of an inorganic moisture-resistant coating to form a first-coated phosphor. In a preferred embodiment of the invention, the electroluminescent phosphor can be copper-activated zinc sulfide (ZnS:Cu) and the first coating can be an aluminum nitride such as that disclosed in the above-mentioned U.S. Pat. No. 6,064,150. This material is an excellent moisture inhibitor but is susceptible to absorbing, or reacting with, atmospheric oxygen and water vapor following removal from the coating processing chamber and exposure to ambient conditions. Thus, additional handling procedures must be put into place to protect the phosphor until its incorporation into a lamp.

This problem is solved by substantially isolating the first-coated phosphor from contact with atmospheric oxygen and moisture after its initial coating and providing the first-coated phosphor with a second layer of an organic moisture-resistant coating to form a second-coated phosphor. Ideally, the second operation is performed in the same apparatus as the first, without removing the first-coated phosphor. Suitable apparatus for coating the phosphors is shown in the above-cited U.S. Pat. No. 6,064,150.

The organic layer must be substantially transmissive of visible light, a good electrical insulator (electroluminescent lamps operate on a capacitive principle, emitting light when placed in an alternating electric field) and must have low moisture permeability. Such materials can be selected from polyesters, polyalkylacrylates, or vinyl-epoxy resins. These materials have been used in the past to reduce the moisture sensitivity of metal halide radiographic phosphors.

Similarly, organic coatings have been suggested for use singly to reduce the moisture sensitivity of electroluminescent phosphors. In the latter case, parylenes, including poly(p-xylylene), and poly(p-α-xylylene) with α=H, Cl, Br, F, alkyl or amino, have been suggested. The use of two layers of different moisture-resistant coatings provides an electroluminescent phosphor with excellent lamp properties and long life. Additionally, the coatings are applied at low temperatures, that is, below 300° C., thus avoiding the potential elimination of sulfur that occurs if a high temperature coating process is employed.

While there have been shown and described what are at present considered to be the preferred embodiments of the invention, it will be apparent to those skilled in the art that various changes and modification can be made herein without departing from the scope of the invention as defined by the appended claims.

What is claimed is:

1. An electroluminescent phosphor particle having thereon a first layer of an aluminum nitride and a second layer of an organic material.

2. The phosphor of claim 1 wherein said electroluminescent phosphor comprises zinc sulfide activated with one or more activators.

3. The phosphor of claim 1 wherein said organic material is substantially transmissive of visible light, electrically insulating, and has low moisture permeability.

4. The phosphor of claim 1 wherein the second layer is a parylene, polyester, polyalkylacrylate, or vinyl-epoxy resin.

5. The phosphor of claim 1 wherein the second layer is a parylene.

6. The phosphor of claim 1 wherein the second layer is poly(p-xylylene) or poly(p-$\alpha$-xylylene) with $\alpha$=H, Cl, Br, F, alkyl or amino.

* * * * *